United States Patent
Becker et al.

(10) Patent No.: US 8,578,772 B2
(45) Date of Patent: Nov. 12, 2013

(54) DEVICE AND METHOD FOR MONITORING OF ROTATING MACHINE ELEMENTS

(75) Inventors: Edwin Becker, Reken (DE); Dieter Busch, Ismaning (DE); Johann Loesl, Buch am Erlbach (DE); Heinrich Lysen, Garching (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 283 days.

(21) Appl. No.: 13/013,550

(22) Filed: Jan. 25, 2011

(65) Prior Publication Data

US 2011/0179863 A1    Jul. 28, 2011

Related U.S. Application Data

(60) Provisional application No. 61/298,993, filed on Jan. 28, 2010.

(51) Int. Cl.
   *G01M 1/22* (2006.01)
(52) U.S. Cl.
   USPC .......................................................... 73/460
(58) Field of Classification Search
   USPC ............... 73/460, 462, 468; 700/279; 33/281, 33/286, 412, 645, 661
   See application file for complete search history.

(56) References Cited

U.S. PATENT DOCUMENTS

| 4,033,042 | A | * | 7/1977 | Bently | 33/661 |
| 4,428,126 | A | * | 1/1984 | Banks | 33/412 |
| 4,538,455 | A | * | 9/1985 | Klufas | 73/112.02 |
| 4,586,264 | A | * | 5/1986 | Zatezalo | 33/412 |
| 4,623,979 | A | * | 11/1986 | Zatezalo et al. | 700/279 |
| 5,263,261 | A | * | 11/1993 | Piety et al. | 33/645 |
| 5,526,282 | A | * | 6/1996 | Nower et al. | 700/279 |
| 5,621,655 | A | * | 4/1997 | Nower et al. | 700/279 |
| 5,896,672 | A | * | 4/1999 | Harris | 33/645 |
| 5,980,094 | A | * | 11/1999 | Nower | 700/279 |
| 6,223,102 | B1 | * | 4/2001 | Busch | 700/279 |
| 7,175,342 | B2 | * | 2/2007 | Tanaka et al. | 374/55 |
| 8,196,304 | B1 | * | 6/2012 | McBride | 33/412 |
| 2004/0024499 | A1 | | 2/2004 | Altieri et al. | |

FOREIGN PATENT DOCUMENTS

DE    195 06 471 A1    8/1996
WO    2009/011638 A1    1/2009

* cited by examiner

*Primary Examiner* — Helen Kwok
(74) *Attorney, Agent, or Firm* — Roberts Mlotkowski Safran & Cole, P.C.; David S. Safran

(57) ABSTRACT

A rotating machine element is monitored for displacements using co-rotating sensors for acceleration, rotation or the direction of gravitation. In doing so, the sensor data are received by a, likewise, co-rotating electronic unit. The data can also be stored and further processed in this electronic unit.

19 Claims, 2 Drawing Sheets

DEVICE AND METHOD FOR MONITORING OF ROTATING MACHINE ELEMENTS

BACKGROUND OF THE INVENTION

1. Field of the Invention

The invention relates to a device and method for monitoring of rotating machine elements.

2. Description of Related Art

U.S. Patent Application Publication 2004/024499 describes how the coupling of a drive shaft of a VTOL aircraft is monitored using magnetostrictive sensors. Here, the sensors are attached to a rigid sleeve. On the end of each shaft, a magnetic target, for example, a permanent magnet, is mounted to the rotating flexible coupling. The target can also be formed of components of the coupling. This target is detected by way of sensors in the rigid sleeve. The rigid sleeve is advantageously arranged without any mechanical contact to one of the two coupling halves.

A similar principle is described in German Patent Application DE 195 06 471. In this document, the displacements of rotating shafts are monitored with inductive sensors, for example, eddy current sensors. This method is also suitable for monitoring of the displacements of couplings on comparatively slow-running shafts, for example, in mills. In order to measure one or more mill shafts in operation, inductive proximity sensors are used. These inductive proximity sensors are attached, for example, to stands on a separate base frame. This procedure is complex.

In contrast to U.S. Patent Application Publication 2004/024499, International Patent Application Publication WO 2009/011638 A1 proposes monitoring of a two-part coupling with a permanent magnet which is inserted into one half of the coupling and a two-dimensionally readable Hall sensor is located in the other half of the coupling. There is also a reference sensor for determining the rotary position.

SUMMARY OF THE INVENTION

A primary object of this invention is to improve existing devices by being able to measure the behavior of the rotating machine element and to evaluate and pre-compute it in a microprocessor.

It is another object of this invention to avoid complex additional devices for holding of the sensors. Moreover, magnets or other elements, such as targets for the sensors, are to be avoided in order to reduce the diversity of parts.

This object is achieved by a device and method by which displacements of a rotating element are determined by means of co-rotating sensors for measuring radial and/or axial forces or by means of co-rotating sensors for measuring the direction of gravitation and wherein the signals of the sensors are detected by a likewise co-rotating electronic unit.

To achieve this object, it is provided that radially acting sensors for measurement of radial forces or accelerations or for measurement of the direction of gravity are mounted in the radial direction in different angular positions on rotating machine elements, for example, coupling elements. In preferred configurations, the sensors are inclinometers or strain gauges, the strain gauges being especially fiber optic strain gauges, for example, according to the FBG principle.

Examples of rotating machine elements are a shaft, bearing ring, or a coupling, for example, in a mill. In mills, but also in other applications, engines or a drive output shaft and the driven shaft, therefore, in the example, the mill shaft, are connected to one another by way of a double tooth coupling, which is generally made as a curved tooth coupling. This double tooth coupling is formed essentially of three parts. On the end of each shaft, for example, a spur gear in which the tooth flanks are arched as a curved tooth coupling, is attached, for example, to a coupling flange. These two gears are interconnected via a sleeve, the teeth attached to the inside of the sleeve engaging the teeth of the spur gears. This coupling can equalize offsets and couple unbalances. These offsets can be both horizontal and vertical displacements of the axes of the two connected shafts relative to one another and also a different angular alignment of the axes of the two shafts.

Coupling elements monitored with the invention can be components of a double tooth coupling, such as the gears connected to the shafts and/or the coupling sleeve, and also coupling halves when it is, for example, a coupling of simpler design in which two disks are connected to one another. This makes it possible for the rotating machine element or the coupling to be provided with its own intelligence, and thus, for it to be able to determine its own state and meaningful characteristics itself and to transmit them to a higher-order computer network or other data processing systems or communications facilities and to trigger alarms. Optionally, a machine element equipped in accordance with the invention, such as a coupling, can determine information about the presumed development of its state and meaningful characteristics from the time behavior of measured values and the characteristics derived from them, therefore, from historical data.

The invention is described in further detail below with reference to the accompanying drawings.

DETAILED DESCRIPTION OF THE INVENTION

Figure 1:
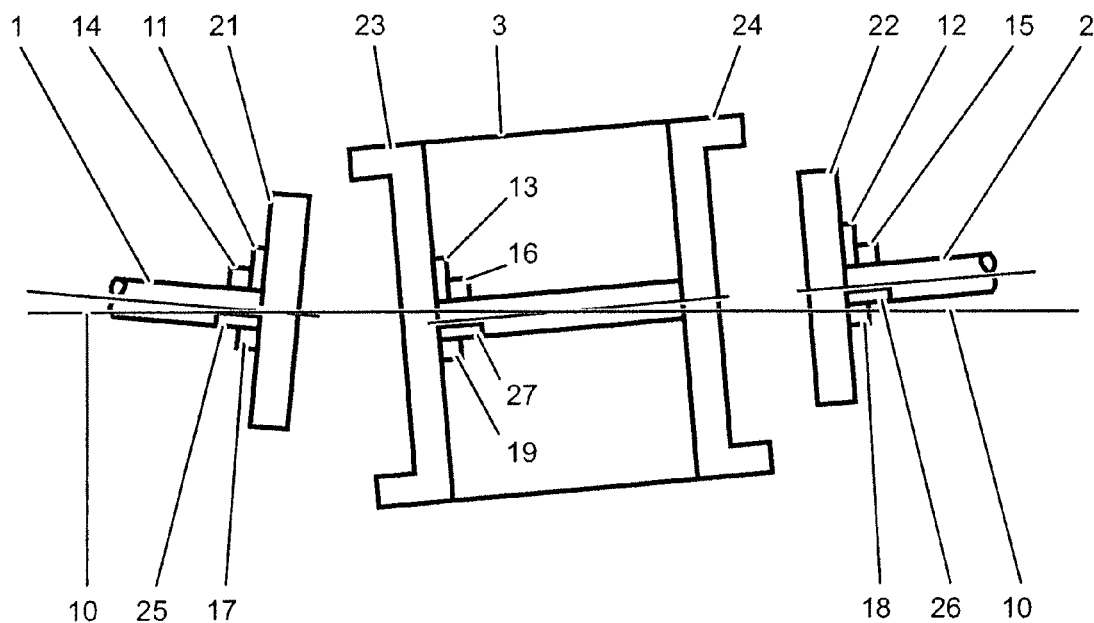
FIG. 1 shows a coupling in cross section with FIGS. 1a-1c showing components of the FIG. 1 coupling.
Figure 1A:
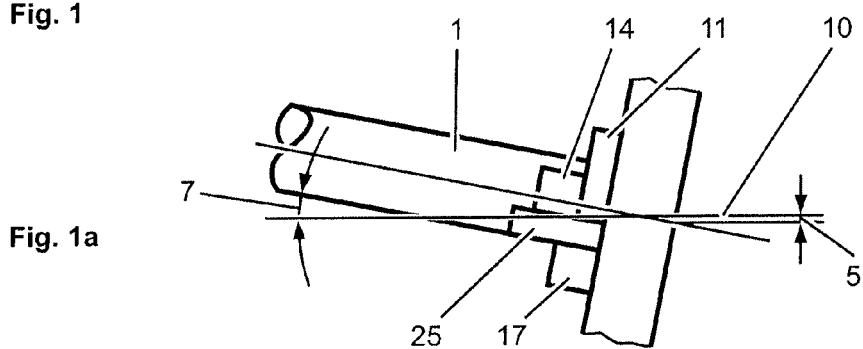
Figure 1B:
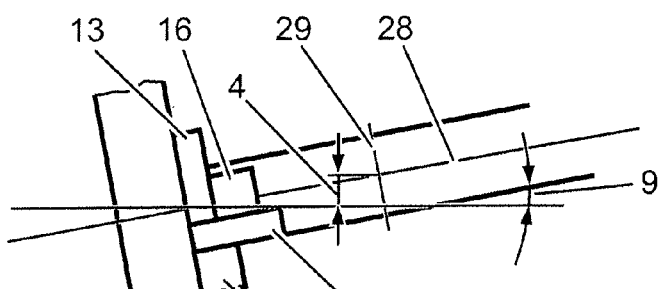
Figure 1C:
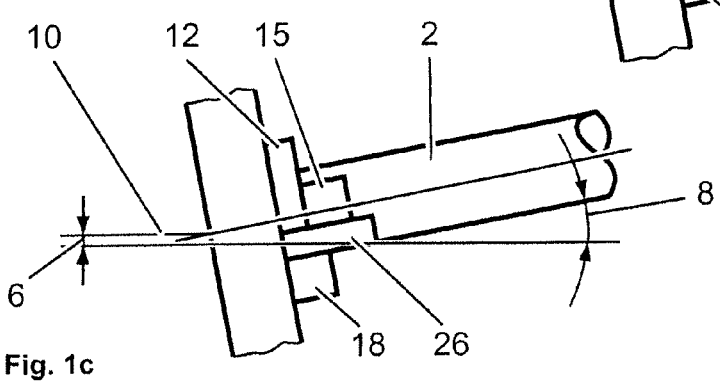
Figure 2:
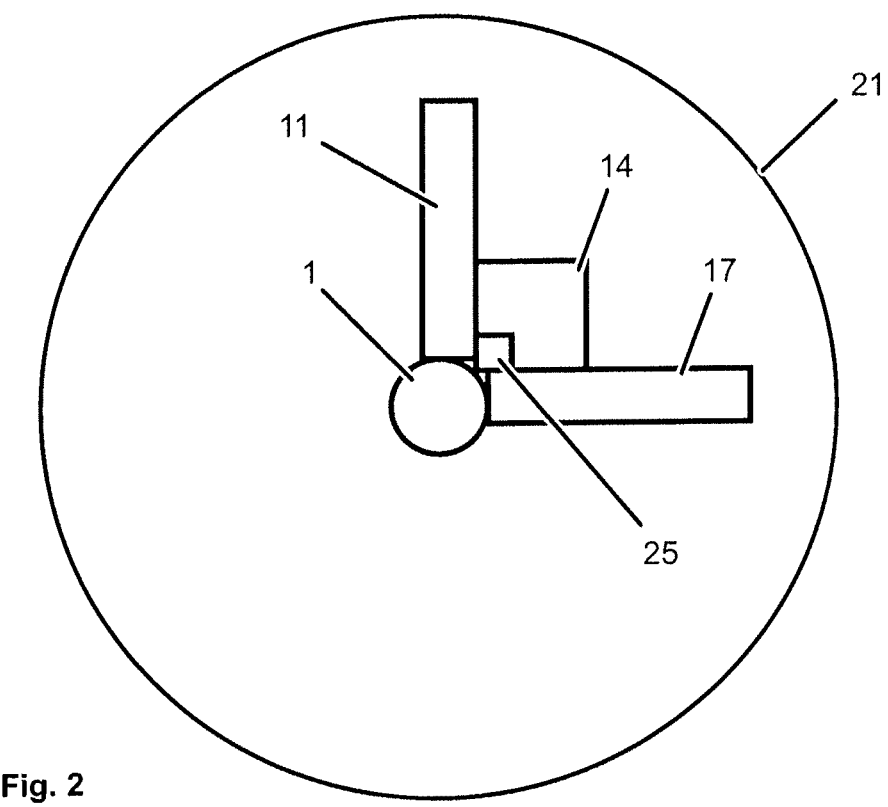
FIG. 2 shows a view of a shaft in the direction looking along the shaft at a coupling element.

A double tooth coupling is shown by way of example in FIGS. 1 and 2. The three parts of the double tooth coupling with the end of the first shaft (FIG. 1a), the middle of the coupling sleeve (FIG. 1b) on the side to the first shaft and the end of the second shaft (FIG. 1c) are shown enlarged for better illustration in the three component figures, FIGS. 1a, 1b, & 1c. It goes without saying that the invention is not limited to double tooth couplings, it also be applicable to other rotating machine elements, such as shafts or bearing rings and on couplings with only two or more than three major assemblies.

A co-rotating disc 21 which is made as a spur gear in a double tooth coupling is mounted on one shaft 1. It is shown that during operation a vertical offset 5 and an angular offset 7 can arise relative to a line of ideal alignment 10. On a cylindrical coupling sleeve 3, an internally toothed region 23 is attached to an end surface of the cylinder so that the teeth of the spur gear 21 engage the teeth of the region 23. On the other end surface of the cylinder, there is a corresponding internally toothed region 24, the teeth of which engage a co-rotating disk 22 which is mounted on a second shaft 2 and which is likewise made as a spur gear. The coupling sleeve 3 can likewise be offset in operation, a parallel offset 4 and an angular offset 9 being shown. For purposes of illustration, the axis 28 of the coupling sleeve 3 and its radially running center line 29 are shown in FIG. 1b. Accordingly, the second shaft 2 has parallel and angular offsets 6, 8 as shown in FIG. 1c.

The first shaft 1 can be, for example, an engine shaft, and the second shaft 2 can be the shaft of a mill driven by the engine shaft. In the operation of the mill, offsets and couple unbalances of the mill shaft 2 always occur. The double tooth coupling is designed to compensate for these offsets and coupling imbalance. Therefore, for curved tooth couplings, the spur gears 21, 22 are equipped with teeth which are provided with a curvature. Thus, movements relative to one another of the spur gears and the shafts connected in this way are enabled.

In accordance with the invention, at least one sensor which is suitable for recording forces in the radial direction or for recording inclination (i. e., direction of gravitation with respect to a reference direction and which is also a radial direction) is mounted on one or more of the three coupling elements, i.e., spur gear 21, spur gear 22 and coupling sleeve 3. Here, it is advantageous to provide sensors at least on the driving side and the driven side. Thus, not only the behavior of a single coupling element, but also the operation and loading of the coupling as a whole can be monitored.

In one especially preferred embodiment, at least two of these sensors are attached on each of these three elements in two differently running radial directions. With this arrangement, the behavior of each of the three important coupling elements and the behavior of the coupling as a whole can be especially accurately monitored. By monitoring the periodicity of the sensor signals, with reference to rpm, a conclusion can be drawn about the number of damaged teeth and their relative position. Determination of delays in start-up, torque values and/or loading values also becomes possible. Peaks in the signal value or a characteristic, such as torque, can be detected in this way with reference to the respective coupling element.

The sensors 11, 17 are mounted on the spur gear 21, and in the example of FIGS. 1 & 2, the angle enclosed by the measurement directions of the sensors is 90°. A third sensor 25, which measures in the axial direction or which measures inclination with an axial reference direction in the sensor, can also be attached. Similarly, as shown in FIG. 1c, sensors 12, 18, 26 are mounted on the spur gear 22 and as shown in FIG. 1b, sensors 13, 19, 27 on coupling sleeve 3 in the same manner as are the sensors 11, 17, 25 shown in FIG. 1a.

Furthermore, in conjunction with the sensors, there is an electronic unit 14 on the respective coupling element which contains, for example, a microprocessor and which monitors one or more of the following functions:

supply of electricity to the sensors 11, 17, 25 storage of measured data of the sensors 11, 17, 25 computation of offsets from measured data of the sensors 11, 17, 25 storage of reference data such as, for example, alarm thresholds for forces or offsets computation of orbits from the measured data computation of vibration data from the offsets determination of the state characteristic of the coupling from forces, offsets, orbits, vibration data and operating parameters wireless or wired communication with an electronic unit 15, 16 attached to another coupling element or a higher-order computer or computer network.

The sensors and the electronic unit are supplied with electricity, preferably, via a generator. This generator produces electrical energy for example, from the rotary motion of the rotating shaft or from thermal gradients. Of course, batteries, rechargeable batteries or fuel cells can also be used to provide the required electrical energy. A computer device, such as a microprocessor in the electronic unit 14, can also be supplied with this electrical energy. This computer device, in a preferred configuration of the invention, has a memory in which measured values or characteristics computed from the measured values can be stored. This computer device computes the offsets or displacements of the shaft ends from the measurement data of the sensors. It is advantageous that vibration data of the shaft ends or other characteristics are computed from these offsets.

The sensors 11, 17, 25 in accordance with the invention are designed as sensors for force or acceleration or sensors for sensing gravitation direction. In a preferred configuration, an inclinometer is used as a sensor for detecting the direction of the force of gravity. MEMS (Micro Electromechanical Systems) inclinometers are especially well suited. In another configuration of the invention, the sensors can be radially running accelerometers, for example, piezoelectric or MEMS-based accelerometers. In another configuration, these sensors can be strain gauges.

Acceleration a is well known to be a measure of Force F since Newton's $F=ma$.

If accelerometers or strain gauges are used as sensors 11, 17, 25, it is useful to additionally provide at least one inclinometer in order to determine the current rotational position of the respective element 21, 22, 3 or of the respective shaft 1, 2.

It is preferred if this set of sensors with the associated electronic unit is attached to each of the three elements 21, 22, 3 shown in the figures or to the shafts 1, 2 which bear the spur gears 21, 22. In the case of using inclinometers as sensors, it is advantageous to mount the sensors close to the axis of rotation of the shaft to reduce the effect of centrifugal force. Attachment at a distance from the axis of rotation which is less than 30% of the radius of the corresponding machine element is useful here.

When a coupling is outfitted in the sense of the invention, each of the electronic units 14, 15, 16 exchanges the data determined by it, either with another electronic unit on the same coupling and/or with a higher-order computer or computer network. Thus, it is possible to determine the offset data for each coupling element individually with reference to an ideal line 10, and from them, the state quantities for the coupling as a whole and to make predictions about the service life of the coupling and the expected development of the characteristics which have been determined from the offset data.

Here, it is unnecessary to use external supports for the sensors or to provide reference elements, such as permanent magnets, outside of the module with the sensors and the electronic unit. Especially when the sensors are made using MEMS technology, is it possible to integrate sensors, the generator and the electronic unit as well as the required unit for data exchange in a single small module. This module can be advantageously integrated in a coupling in the construction of the latter without causing an imbalance. While a conventional version can be easily built by means of electrical and electronic components on a board, it is especially advantageous if the circuit is executed on flexible foils, not on boards because, in this way, further miniaturization and weight reduction, as well as adaptation to the shapes of different mechanical components, are possible. Because the electronic modules are made identically for the most varied machine elements, such as spur gears of couplings, coupling sleeves, shafts, roller-contact bearing rings, etc., especially economical production for the devices in accordance with the invention is achieved.

For the manufacturer and operator of such a coupling, it can be helpful to retrieve data from the coupling itself, which yield information about the operating states actually present on the coupling in the past and possible loads exceeding the norm. Likewise, the invention makes it possible to interrogate the current state of the coupling as well as stored data from the past via an operating network, such as a WLAN, or by way of other communications links, such as Bluetooth or self-organizing networks. Here, not only wireless communications paths can be used, but also wired routes, which dictate, for example, the connection of a data collector with a plug-and-socket connection via a communications cable to the electronic unit. For the operator of such a coupling, in turn, it is advantageous to continuously or at least regularly interrogate the electronic units 14, 15, 16, in order to detect the occurrence of damage at an early stage, and thus, to initiate the required maintenance measures in time. It is also advantageous that the module integrated into the coupling automatically communicates that the alarm thresholds or other reference values stored in the electronic unit have been exceeded by way of an existing wireless network or other communications means.

It is especially advantageous here if the measurement data of the sensors are evaluated either in the electronic units or in a computer network supplied with data from these electronic units. Thus, the behavior of a new coupling after installation in operation can be measured on the machine with defined loading. These measurement data are then stored as a reference. Over time, other measurement data arise which are filed and stored together with the time of the measurement. Instead of measurement data, characteristics determined from these measurement data can also be stored. In the evaluation of the measurement data in a computer network or in one of the electronic units, these measurement data and the state characteristics which have been determined from them can then be assigned to the respective operating states of the machine. These operating states include run-up, coasting, continuous operation, the respective operating load and extraordinary loads, such as, for example, exceeding the nominal rpm. Due to the amount of data which arises with collection of these measurement data, it can be useful to reduce these amounts of data. A suitable method for reducing these amounts of data is use of the rainflow counting method (see, e.g., Downing, S. D., Socie, D. F. (1982). "Simple rainflow counting algorithms". *International Journal of Fatigue*, Volume 4, Issue 1, January, 31-40.). However, other methods can also be used, such as determining average values, envelope curves, cepstra or other characteristics which represent a measure of the operating or load state.

To date coupling loads have been serviced or inspected preferably according to empirical values and guide values. By using the sensors and electronic units in accordance with the invention it becomes possible to pass to state-referenced maintenance for couplings.

The invention can be used not only on couplings of slow-running installations, such as mills or rotary tube furnaces, but also on shafts themselves in order to detect their displacements in the sense of torsion and bending. With regard speed, the use of the invention is not limited to comparatively slow-running machines, such as the aforementioned mills, but the invention can also be used on faster running or very fast running elements of machines, such as turbines or turbomachinery.

What is claimed is:

1. Device for monitoring of displacements of rotating machine elements, comprising:
    at least one rotating machine element,
    at least one sensor for measurement of at least one of radial forces and the direction of gravitation, said at least one sensor being mounted so as to co-rotate with the rotating machine element, and
    at least one electronic unit connected to the at least one sensor for receiving measurement data detected thereby,
    wherein the at least one machine element is a coupling having a first coupling element which is connected to a first shaft, a second coupling element which is connected to a second shaft and wherein said at least one sensor is mounted on at least on a driving side of the coupling and on a driven side of the coupling.

2. Device in accordance with claim 1, wherein the coupling further comprises a third coupling element located between the first and second coupling elements.

3. Device in accordance with claim 1, further comprising at least one additional sensor which acts in an axial direction.

4. Device in accordance with claim 1, wherein said at least one sensor comprises at least one inclinometer.

5. Device in accordance with claim 4, wherein said inclinometer comprises a three dimensional inclinometer which is adapted to measure direction of gravitation with a reference direction in a first and second radial dimension and to measure direction of gravitation with a reference direction in a third axial dimension.

6. Device in accordance with claim 1, wherein the at least one electronic unit is adapted for computing displacements of the at least one machine element from the measured forces or the direction of gravitation.

7. Device in accordance with claim 6, wherein the at least one electronic unit is adapted for computing at least one of orbits, vibration data and state characteristics of the at least one machine element from the displacements.

8. Device in accordance with claim 1, wherein the at least one electronic unit is equipped with a memory in which at least one of reference values, measured values and computation results are stored.

9. Device in accordance with claim 1, wherein the electronic unit is adapted for transmitting at least one of measurement data, orbits, vibration data, state characteristics and reference values which are wirelessly transmitted to at least one of another electronic unit, a computer, a communications device and for receiving reference values wirelessly from a computer or a communications device.

10. Device in accordance with claim 1, wherein at least one of the at least one sensor and the at least one electronic unit are connected to a generator for receiving electrical energy.

11. Device in accordance with claim 1, wherein said at least one sensor comprises at least one accelerometer.

12. Device in accordance with claim 1, wherein the at least one sensor comprises at least one of accelerometers and inclinometers which are mounted at distance of less than 30% of a radius of the machine element from an axis of rotation of the machine element.

13. Device in accordance with claim 1, wherein said at least one sensor comprises two accelerometers which measure different radial directions, and a third accelerometer which measures in an axial direction.

14. Device in accordance with claim 1, wherein the at least one sensor comprises at least one strain gage.

15. Device in accordance with claim 14, wherein said at least one machine element comprises a plurality of machine elements and on each of the machine elements there are two strain gauges which run in different radial directions, and a third strain gage which measures in an axial direction.

16. Device in accordance with claim 14, wherein the at least one strain gauge is a fiber optic strain gauge.

17. Coupling, comprising
a driving side rotatable coupling element for connection to a first shaft,
a driven side rotatable coupling element for connection to a second shaft,
at least one sensor provided at least mounted on the driving side coupling element and mounted on the driven side coupling element for measurement of at least one of radial forces and the direction of gravitation, said at least one sensor being mounted to co-rotate with the respective coupling element, and
at least one electronic unit connected to the sensors for receiving measurement data detected thereby.

18. Method for determining displacements of rotating machine elements, comprising the steps of:
applying at least one sensor to at least one rotatable machine element, comprised of a coupling having a first coupling element which is connected to a first shaft and a second coupling element which is connected to a second shaft, and wherein at least one said sensor is mounted at least on a driving side of the coupling and on a driven side of the coupling so as to rotate therewith,
measuring at least one of radial forces and the direction of gravitation with said at least one sensor as the at least one sensor co-rotates with the side of the coupling to which the at least one sensor has been applied, and
using a co-rotating electronic unit to determine at least one of displacements and axial forces based upon signals obtained by the co-rotating electronic unit from said at least one sensor.

19. Method in accordance with claim 18, comprising the further step of determining at least one of orbits, vibration data and state characteristics of the at least one rotatable machine element with the at least one electronic unit determined based upon the signals from said at least one sensor.

* * * * *